United States Patent [19]

Takase et al.

[11] 4,291,952
[45] Sep. 29, 1981

[54] GAUSS TYPE LENS SYSTEM

[75] Inventors: Hiroshi Takase, Hachiouji; Toru Fujii, Hino, both of Japan

[73] Assignee: Olympus Optical Co., Ltd., Tokyo, Japan

[21] Appl. No.: 112,607

[22] Filed: Jan. 16, 1980

[30] Foreign Application Priority Data

Jan. 26, 1979 [JP] Japan .................................. 54-7840

[51] Int. Cl.³ .............................................. G01B 9/42
[52] U.S. Cl. .................................................. 350/471
[58] Field of Search ........................................ 350/471

[56] References Cited

U.S. PATENT DOCUMENTS 3,485,549 12/1969 Woltche .............................. 350/471
4,123,144 10/1978 Mandler et al. ..................... 350/471

Primary Examiner—Conrad J. Clark
Attorney, Agent, or Firm—Cushman, Darby & Cushman

[57] ABSTRACT

A Gauss type lens system comprising a first, second, third and fourth lens components, the first lens component being a positive meniscus lens, the second lens component being a cemented doublet consisting of a positive lens and negative lens, the third lens component being a cemented doublet consisting of a negative lens and positive lens, the fourth lens component being a biconvex lens, the Gauss type lens system having the aperture ratio of 1.8 and field angle of 46° and being made low in price by using high refractive-index high dispersion glass materials for many of lenses.

7 Claims, 6 Drawing Figures

FIG. 6
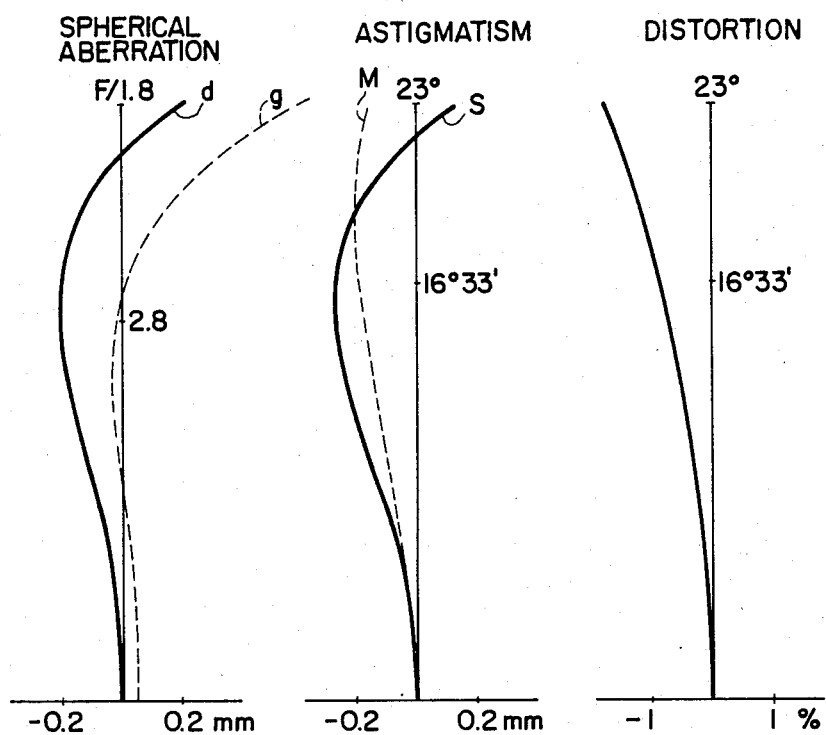
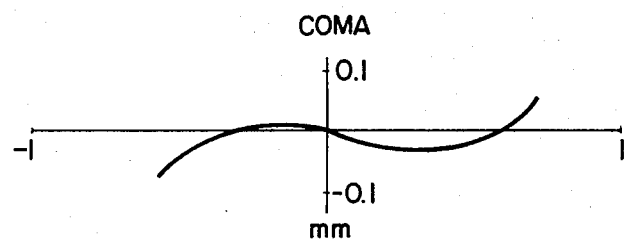

GAUSS TYPE LENS SYSTEM

BACKGROUND OF THE INVENTION (a) Field of the Invention

The present invention relates to a Gauss type lens system and, more particularly, to a low-price Gauss type lens system with the aperture ratio of 1.8 and field angle of 46° or more.

(b) Description of the Prior Art

As a known Gauss type lens system with the aperture ratio of 1.8 and field angle of 46° or more, there is a lens system disclosed, for example, in Japanese published examined patent application No. 41339/71. One of characteristics of this lens system is that its back focal length is long and the actual back focal length of this lens system is 0.72 f. In case of this lens system, however, the thickness of cemented doublet on the object side is large and, therefore, the back focal length is limited even when it is made long. Moreover, as the thickness of cemented doublet on the object side of this lens system is large, the intensity of light in the marginal portion becomes insufficient. Moreover, the material cost becomes high because glass materials with high refractive indices are used for the first lens component, lens element on the image side in the cemented doublet arranged on the image side, and lens component nearest the image side. To prevent the high material cost, it is all right when high refractive-index high-dispersion glass materials are used. In case of the known lens system disclosed in Japanese published unexamined patent application No. 140322/77, high refractive-index high-dispersion glass material is used for the first lens component, which is a positive lens. However, in case of this lens system, the aperture ratio is 1:2 and, therefore, it is comparatively easy to obtain a lens system with favourably corrected aberration. Moreover, there is high degree of freedom in the selection of glass materials for the lens element on the image side in the third lens component and for the fourth lens component.

SUMMARY OF THE INVENTION

It is, therefore, a primary object of the present invention to provide a Gauss type lens system for which the aperture ratio is 1.8, field angle is 46° or more and back focal length is long and which has favourable characteristics in spite of the fact that the price of the lens system is made low by using high refractive-index high-dispersion glass materials for many of lenses.

The lens system according to the present invention is a Gauss type lens system comprising a first, second, third and fourth lens components in the order from the object side as shown in FIG. 1, the first lens component being a positive meniscus lens, the second lens component being a cemented doublet consisting of a positive lens and negative lens, the third lens component being a cemented doublet consisting of a negative lens and positive lens, the fourth lens component being a biconvex lens.

The lens system according to the present invention is arranged to obtain a satisfactorily long back focal length by arranging that the second lens component, which is the cemented doublet on the object side in the above-mentioned lens configuration, has small thickness. Aggravation of spherical aberration and coma flare to be caused by the above is prevented by adequate distribution of focal lengths for the first and fourth lens components and, moreover, by adequately selecting the radius of curvature of the lens surface on the object side of the first lens component and difference between refractive indices of respective lenses constituting the second lens component. For favourable correction of curvature of field, it is essential that the first lens component, positive lens in the third lens component and fourth lens component have high refractive indices. However, to prevent increase of material cost, it is preferable to use high refractive-index high-dispersion glass materials for most of these lenses. As, however, correction of chromatic aberration becomes difficult because of the above, glass materials with adequate dispersions are used for the negative lenses in the second and third lens components in the lens system according to the present invention.

Due to the above-mentioned reasons, the lens system according to the present invention is arranged to satisfy the following conditions.

(1) $(\nu_1 + \nu_5 + \nu_6)/3 < 39$, $\nu_3$, $\nu_4 < 30$
(2) $1.7 < n_1$, $n_5$, $n_6$
(3) $0.07 < n_3 - n_2 < 0.21$
(4) $0.13\,f < d_3 + d_4 < 0.17\,f$
(5) $0.9 < f_1/f_6 < 1.3$
(6) $0.58\,f < r_1 < 0.72\,f$

In the above-mentioned conditions, reference symbols $\nu_1$, $\nu_3$, $\nu_4$, $\nu_5$ and $\nu_6$ respectively represent Abbe's numbers of the first lens component, lens on the image side in the second lens component, respective lenses constituting the third lens component, and fourth lens component, reference symbols $n_1$, $n_2$, $n_3$, $n_5$ and $n_6$ respectively represent refractive indices of the first lens component, respective lenses constituting the second lens component, lens on the image side in the third lens component, and fourth lens component, reference symbols $d_3$ and $d_4$ respectively represent thickness of respective lenses constituting the second lens component, reference symbol $r_1$ represents the radius of curvature of the lens surface on the object side of the first lens component, reference symbols $f_1$ and $f_6$ respectively represent focal lnegths of the first and fourth lens components and reference symbol $f$ represents the focal length of the lens system as a whole.

Now, the contents of respective conditions are described below.

In the condition (1), $(\nu_1 + \nu_5 + \nu_6)/3 < 39$ is the condition required for using high refractive-index high-dispersion glass materials for most of the first lens component, lens on the image side in the third lens component, and fourth lens component in order to obtain a low-price lens system which is one of the objects of the present invention and, at the same time, for enabling to correct chromatic aberration favourably. If this condition is not satisfied, it becomes impossible to attain the above-mentioned object. The condition $\nu_3$, $\nu_4 < 30$ is established for the purpose of favourably correcting chromatic aberration when the condition $(\nu_1 + \nu_5 + \nu_6)/3 < 39$ is satisfied. If this condition is not satisfied, correction of chromatic aberration becomes unfavourable.

The condition (2) is established for the purpose of favourably correcting Petzval's sum. If this condition is not satisfied, it becomes impossible to correct Petzval's sum favourably.

The condition (3) is established for the purpose of correcting the flare in the marginal portion to be caused by spherical aberration and flare to be caused by coma (coma flare) and keeping the curvature of field to an adequate value. If $n_3-n_2$ becomes smaller than the lower limit of condition (3), spherical aberration will be overcorrected in the marginal portion near the aperture and flare will increase. Besides, coma flare will be caused. If $n_3-n_2$ becomes larger than the upper limit of condition (3), curvature of field will be undercorrected.

The condition (4) is established for the purpose of making the back focal length long and correcting coma flare. If $d_3+d_4$ becomes larger than the upper limit of condition (4), it becomes impossible to make the back focal length long. If $d_3+d_4$ becomes smaller than the lower limit of condition (4), coma flare will be caused.

The condition (5) is established for the purpose of eliminating coma flare, which tends to occur when the condition (4) is established, making spherical aberration and astigmatism well balanced and keeping the back focal length long. If $f_1/f_6$ becomes larger than the upper limit of condition (5), coma flare will be caused and spherical aberration and astigmatism will become unbalanced. If $f_1/f_6$ becomes smaller than the lower limit of condition (5), it becomes impossible to make the back focal length long.

As a result of the fact that it is arranged to correct coma flare by the cemented surface of second lens component by establishing the condition (3), the correcting effect of this cemented surface for spherical aberration becomes excessively large. Therefore, it is arranged to correct spherical aberration favourably by establishing the condition (6). Besides, the condition (6) is necessary also for making aberrations well balanced. If $r_1$ becomes larger than the upper limit of condition (6), spherical aberration will be aggravated. If $r_1$ becomes smaller than the lower limit of condition (6), it becomes impossible to correct aberrations in the favourably balanced state.

Besides, in order to make the conditions (4) and (5) more effective, it is preferable to arrange so that the lens system according to the present invention further satisfies the following condition (7) wherein reference symbols $d_6$ and $d_7$ respectively represent thicknesses of respective lenses constituting the third lens component.

(7)  $0.12\,f < d_6+d_7 < 0.16\,f$

That is, by the condition (7), it is possible to correct spherical aberration more favourably and to prevent coma flare from occurring.

When $d_6+d_7$ becomes smaller than the lower limit of condition (7), spherical aberration will be overcorrected. When $d_6+d_7$ becomes larger than the upper limit of condition (7), spherical aberration will be undercorrected and coma flare will be caused.

BRIEF DESCRIPTION OF THE DRAWINGS

FIGS. 2 through 6 respectively show graphs illustrating aberration curves of embodiments 1 through 5 of the present invention.

DESCRIPTION OF THE PREFERRED EMBODIMENTS

Figure 1:
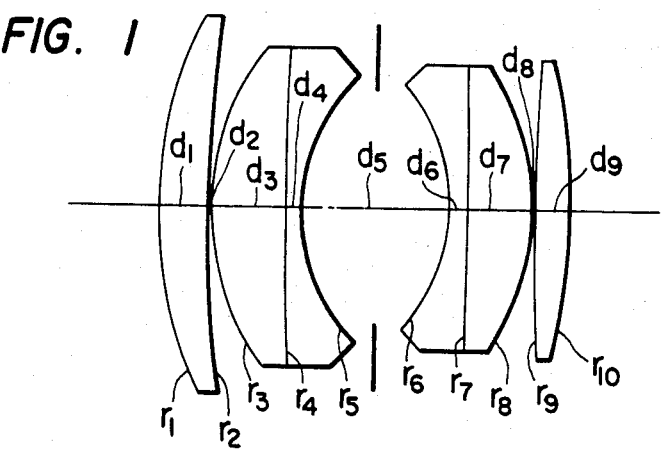
FIG. 1 shows a sectional view of the Gauss type lens system according to the present invention.
Figure 2:
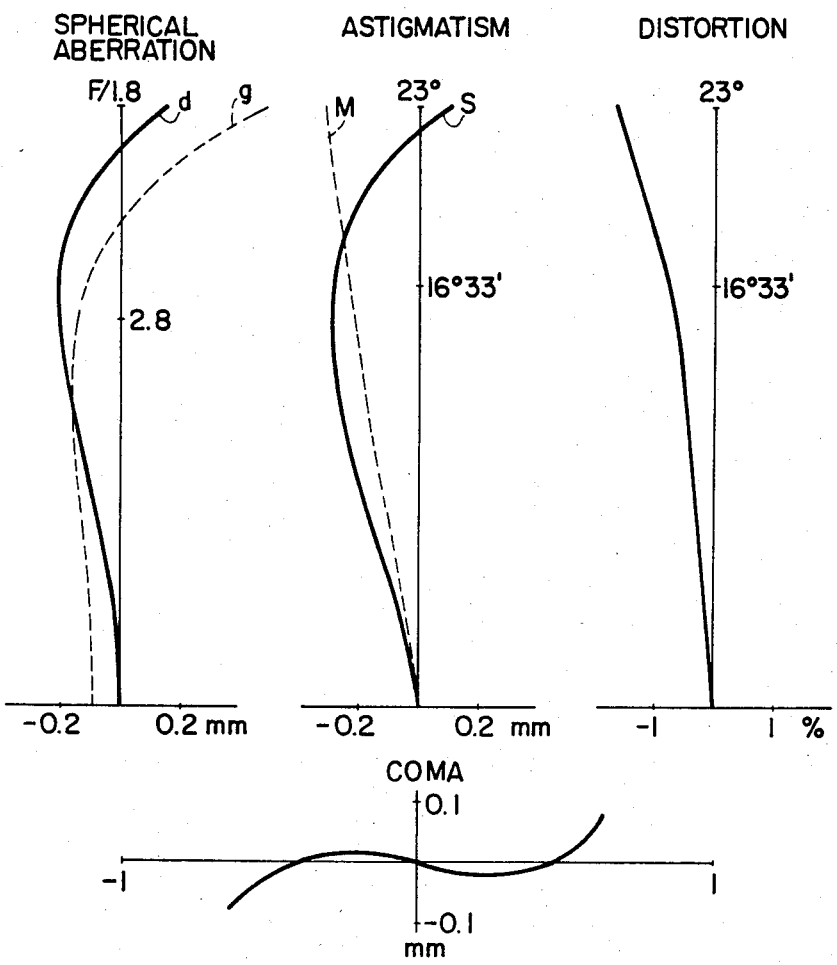
Figure 3:
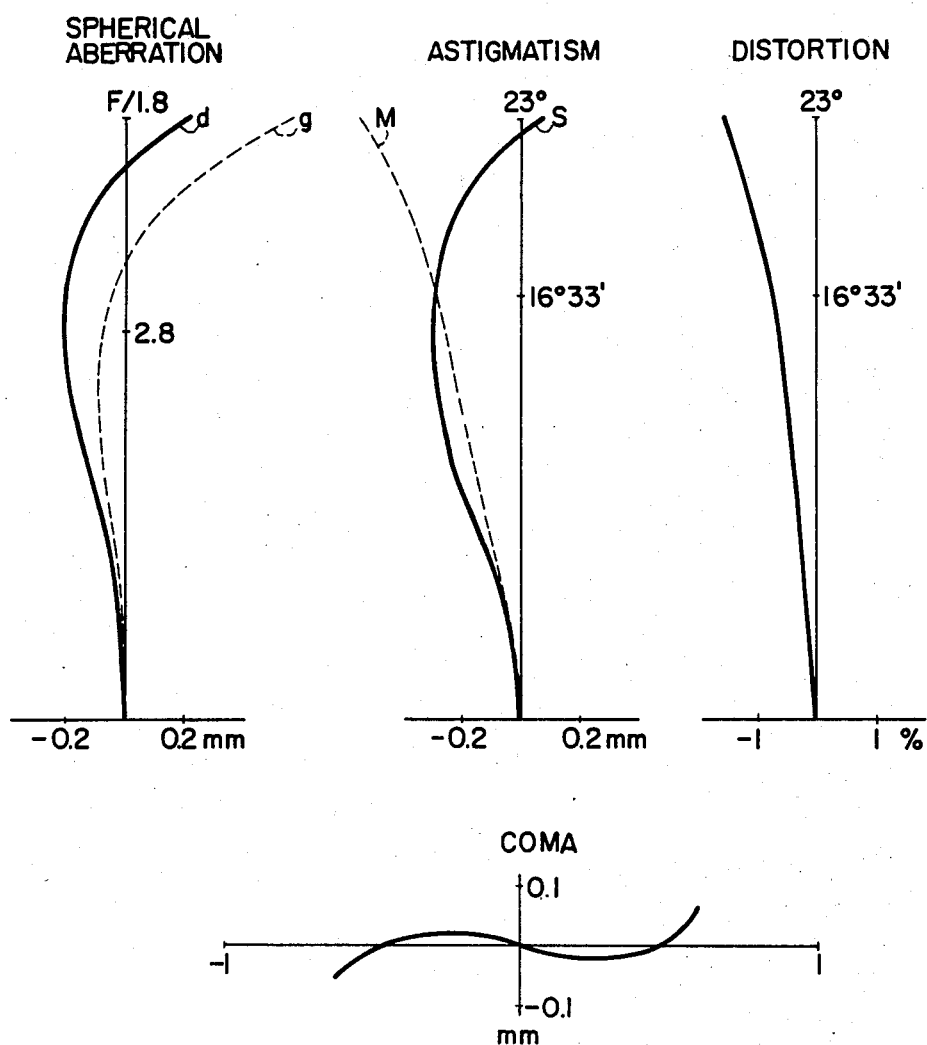
Figure 4:
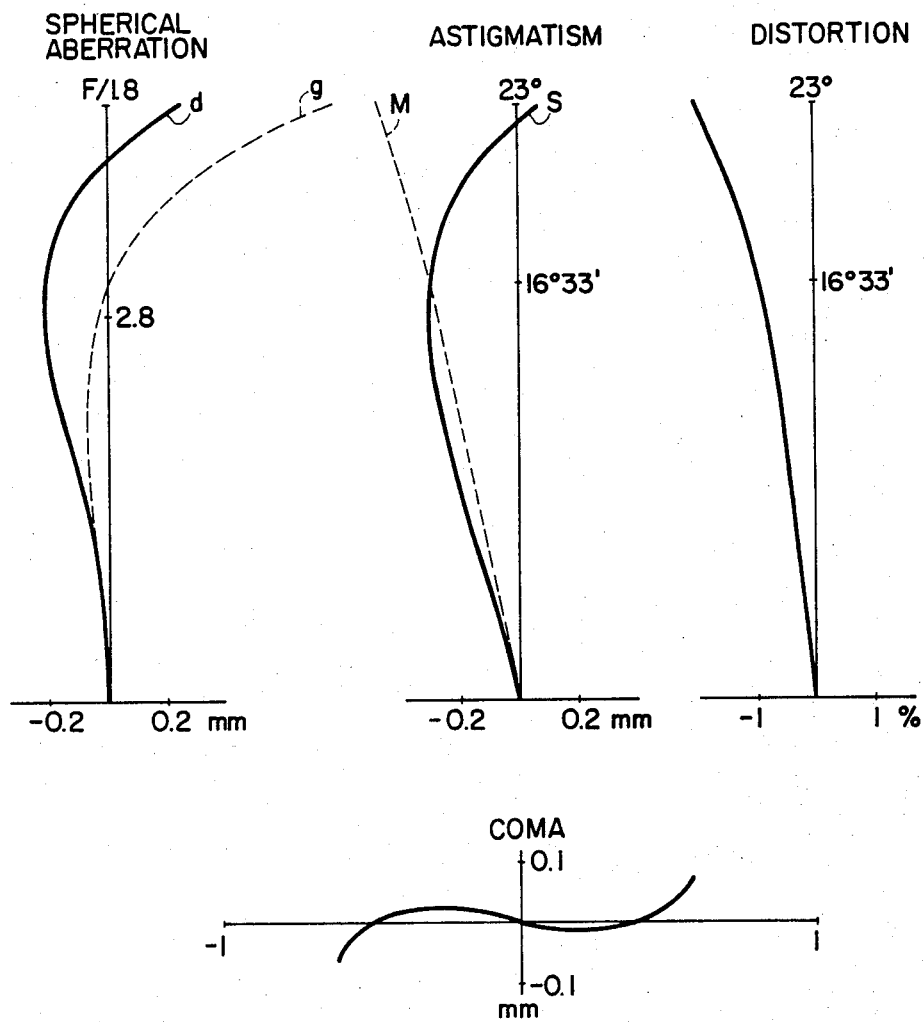
Figure 5:
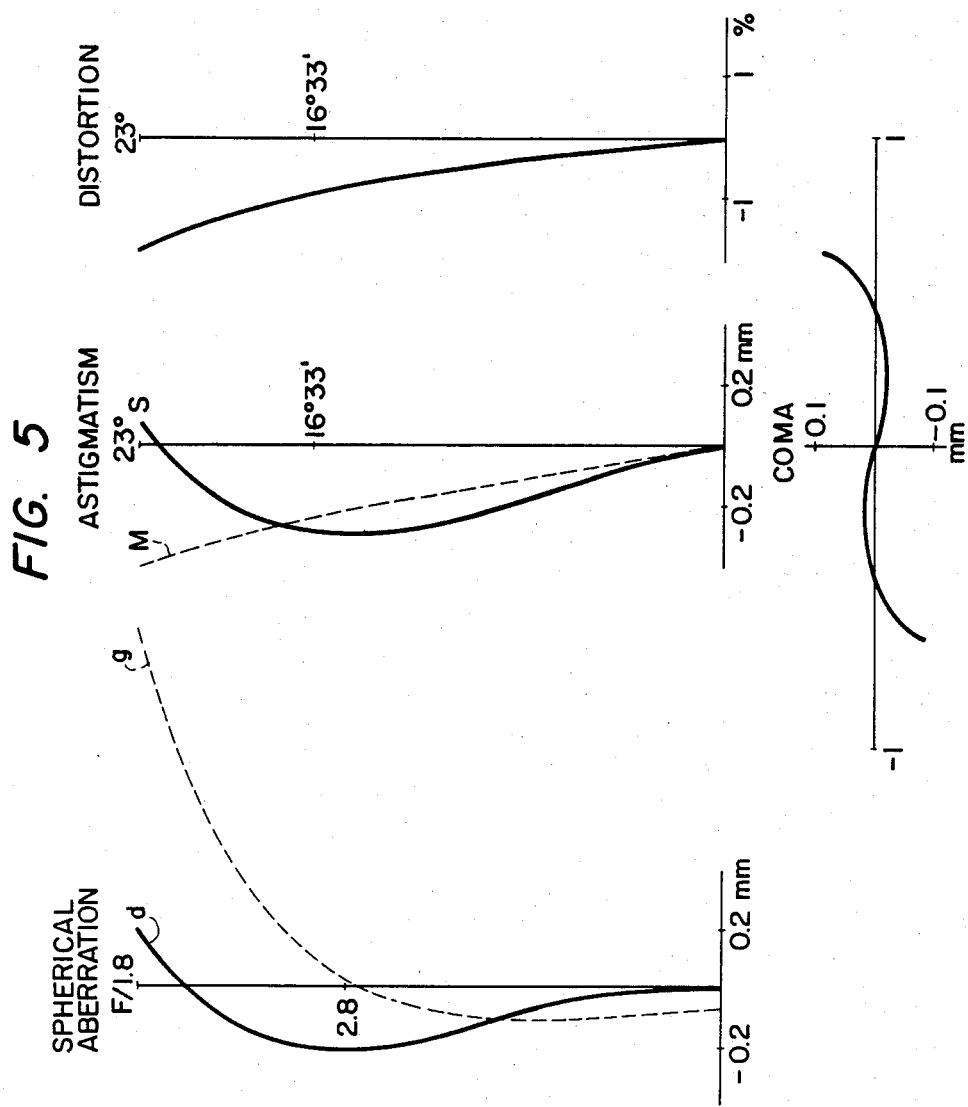

Now, the preferred embodiments of the Gauss type lens system according to the present invention explained in the above are shown below.

Embodiment 1

$f = 100$  $F/1.8$ $r_1 = 64.093$

—continued

Embodiment 1

$r_2 = 236.829$
  $d_1 = 8.687$  $n_1 = 1.80518$  $\nu_1 = 25.4$
  $d_2 = 0.309$
$r_3 = 41.108$
  $d_3 = 12.336$  $n_2 = 1.58913$  $\nu_2 = 61.1$
$r_4 = 814.577$
  $d_4 = 2.510$  $n_3 = 1.78472$  $\nu_3 = 25.7$
$r_5 = 29.030$
  $d_5 = 25.097$
$r_6 = -29.731$
  $d_6 = 2.510$  $n_4 = 1.76182$  $\nu_4 = 26.6$
$r_7 = 944.518$
  $d_7 = 11.100$  $n_5 = 1.834$  $\nu_5 = 37.2$
$r_8 = -39.351$
  $d_8 = 0.290$
$r_9 = 467.767$
  $d_9 = 6.178$  $n_6 = 1.834$  $\nu_6 = 37.2$
$r_{10} = -99.895$ $\Sigma d = 69.016$
$f_1 = 106.742$  $f_6 = 99.191$  $f_1/f_6 = 1.076$
$f_B = 72.877$ Embodiment 2

$f = 100$  $F/1.8$ $r_1 = 65.388$
  $d_1 = 8.687$  $n_1 = 1.78472$  $\nu_1 = 25.7$
$r_2 = 252.404$
  $d_2 = 0.290$
$r_3 = 41.374$
  $d_3 = 12.722$  $n_2 = 1.60311$  $\nu_2 = 60.7$
$r_4 = 673.682$
  $d_4 = 2.510$  $n_3 = 1.78472$  $\nu_3 = 25.7$
$r_5 = 28.932$
  $d_5 = 25.097$
$r_6 = -29.214$
  $d_6 = 3.185$  $n_4 = 1.72825$  $\nu_4 = 28.5$
$r_7 = -942.808$
  $d_7 = 10.811$  $n_5 = 1.80610$  $\nu_5 = 41.0$
$r_8 = -39.208$
  $d_8 = 0.290$
$r_9 = 475.436$
  $d_9 = 6.236$  $n_6 = 1.80610$  $\nu_6 = 41.0$
$r_{10} = -93.919$ $\Sigma d = 69.827$
$f_1 = 110.210$  $f_6 = 97.769$  $f_1/f_6 = 1.127$
$f_B = 73.063$ Embodiment 3

$f = 100$  $F/1.8$ $r_1 = 64.790$
  $d_1 = 7.452$  $n_1 = 1.76182$  $\nu_1 = 26.6$
$r_2 = 200.599$
  $d_2 = 0.425$
$r_3 = 41.990$
  $d_3 = 12.336$  $n_2 = 1.697$  $\nu_2 = 48.5$
$r_4 = 398.114$
  $d_4 = 2.896$  $n_3 = 1.78472$  $\nu_3 = 25.7$
$r_5 = 28.541$
  $d_5 = 25.444$
$r_6 = -28.991$
  $d_6 = 2.896$  $n_4 = 1.76182$  $\nu_4 = 26.6$
$r_7 = -386.093$
  $d_7 = 11.023$  $n_5 = 1.762$  $\nu_5 = 40.2$
$r_8 = -36.948$
  $d_8 = 0.193$
$r_9 = 286.357$
  $d_9 = 6.042$  $n_6 = 1.8044$  $\nu_6 = 39.6$
$r_{10} = -104.178$ $\Sigma d = 68.707$
$f_1 = 122.708$  $f_6 = 95.622$  $f_1/f_6 = 1.283$
$f_B = 72.293$

| Embodiment 4 | | | | |
|---|---|---|---|---|
| | $f = 100$ | F/1.8 | | |
| $r_1 = 60.506$ | | | | |
| | $d_1 = 8.303$ | $n_1 = 1.78472$ | $\nu_1 = 25.7$ | |
| $r_2 = 202.144$ | | | | |
| | $d_2 = 0.290$ | | | |
| $r_3 = 39.774$ | | | | |
| | $d_3 = 11.790$ | $n_2 = 1.58913$ | $\nu_2 = 61.1$ | |
| $r_4 = 384.449$ | | | | |
| | $d_4 = 2.539$ | $n_3 = 1.76182$ | $\nu_3 = 26.6$ | |
| $r_5 = 27.657$ | | | | |
| | $d_5 = 25.181$ | | | |
| $r_6 = -28.413$ | | | | |
| | $d_6 = 2.504$ | $n_4 = 1.76182$ | $\nu_4 = 26.6$ | |
| $r_7 = 206.272$ | | | | |
| | $d_7 = 10.417$ | $n_5 = 1.804$ | $\nu_5 = 49.6$ | |
| $r_8 = -36.892$ | | | | |
| | $d_8 = 0.290$ | | | |
| $r_9 = 430.966$ | | | | |
| | $d_9 = 5.986$ | $n_6 = 1.80518$ | $\nu_6 = 25.4$ | |
| $r_{10} = -95.779$ | | | | |
| | $\Sigma d = 67.300$ | | | |
| | $f_1 = 107.278$ | $f_6 = 97.820$ | $f_1/f_6 = 1.097$ | |
| | $f_B = 73.063$ | | | |

| Embodiment 5 | | | | |
|---|---|---|---|---|
| | $f = 100$ | F/1.8 | | |
| $r_1 = 69.607$ | | | | |
| | $d_1 = 7.436$ | $n_1 = 1.78472$ | $\nu_1 = 25.7$ | |
| $r_2 = 235.144$ | | | | |
| | $d_2 = 0.424$ | | | |
| $r_3 = 43.088$ | | | | |
| | $d_3 = 12.714$ | $n_2 = 1.65100$ | $\nu_2 = 56.2$ | |
| $r_4 = 426.190$ | | | | |
| | $d_4 = 3.275$ | $n_3 = 1.78472$ | $\nu_3 = 25.7$ | |
| $r_5 = 30.390$ | | | | |
| | $d_5 = 25.390$ | | | |
| $r_6 = -30.236$ | | | | |
| | $d_6 = 3.468$ | $n_4 = 1.72151$ | $\nu_4 = 29.2$ | |
| $r_7 = -315.462$ | | | | |
| | $d_7 = 11.558$ | $n_5 = 1.81554$ | $\nu_5 = 44.5$ | |
| $r_8 = -41.358$ | | | | |
| | $d_8 = 0.193$ | | | |
| $r_9 = 373.982$ | | | | |
| | $d_9 = 6.030$ | $n_6 = 1.81554$ | $\nu_6 = 44.5$ | |
| $r_{10} = -105.510$ | | | | |
| | $\Sigma d = 70.488$ | | | |
| | $f_1 = 123.561$ | $f_6 = 101.479$ | $f_1/f_6 = 1.218$ | |
| | $f_B = 72.454$ | | | |

In the above embodiments, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, and reference symbol $f_B$ represents the back focal length.

Seidel coefficients of respective embodiments shown in the above are as shown below.

| Embodiment 1 | | | | | |
|---|---|---|---|---|---|
| | Spherical Aberration | Astigmatism | Coma | Distortion | Petzval Sum |
| 1 | 0.9385 | 0.0361 | 0.1840 | 0.1435 | 0.6959 |
| 2 | 0.1511 | 0.8477 | −0.3573 | −1.5517 | −0.1883 |
| 3 | −0.0579 | −0.0095 | −0.0235 | 0.3619 | 0.9018 |
| 4 | −0.6253 | −0.5051 | 0.5620 | 0.4463 | 0.0085 |
| 5 | −1.3421 | −0.1903 | −0.5054 | −0.6420 | −1.5146 |
| 6 | −3.0415 | −0.3545 | 1.0384 | 0.6176 | −1.4544 |
| 7 | 0.0474 | 0.0874 | 0.0644 | 0.1219 | 0.0024 |
| 8 | 2.2251 | 0.0813 | −0.4254 | −0.2365 | 1.1556 |
| 9 | −0.0011 | −0.1801 | 0.0139 | 1.0728 | 0.072 |
| 10 | 1.9260 | 0.1617 | −0.5581 | −0.1788 | 0.4552 |
| Σ | −0.2202 | −0.0283 | −0.0069 | 0.1551 | 0.1593 |

| Embodiment 2 | | | | | |
|---|---|---|---|---|---|
| | Spherical Aberration | Astigmatism | Coma | Distortion | Petzval Sum |
| 1 | 0.8812 | 0.0372 | 0.1811 | 0.1458 | 0.6724 |
| 2 | 0.1426 | 0.8109 | −0.3401 | −1.5181 | −0.1742 |
| 3 | −0.0378 | −0.0057 | −0.0147 | 0.3510 | 0.9093 |
| 4 | −0.5484 | −0.4553 | 0.4997 | 0.4063 | 0.0094 |
| 5 | −1.3610 | −0.1911 | −0.5100 | −0.6412 | −1.5197 |
| 6 | −3.1155 | −0.3458 | 1.0379 | 0.5957 | −1.4424 |
| 7 | 0.0306 | 0.0804 | 0.0496 | 0.1260 | −0.0026 |
| 8 | 2.1926 | 0.0731 | −0.4004 | −0.2212 | 1.1383 |
| 9 | −0.0008 | −0.1676 | 0.0116 | 1.0635 | 0.0939 |
| 10 | 2.0459 | 0.1353 | −0.5262 | −0.1570 | 0.4752 |
| Σ | 0.2259 | −0.0286 | −0.0114 | 0.1509 | 0.1596 |

| Embodiment 3 | | | | | |
|---|---|---|---|---|---|
| | Spherical Aberration | Astigmatism | Coma | Distortion | Petzval Sum |
| 1 | 0.9024 | 0.0408 | 0.1919 | 0.1506 | 0.6674 |
| 2 | 0.0483 | 0.5826 | −0.1677 | −1.2754 | −0.2156 |
| 3 | 0.0270 | 0.0033 | 0.0094 | 0.3411 | 0.9781 |
| 4 | −0.2425 | −0.2032 | 0.2220 | 0.1793 | 0.0073 |
| 5 | −1.3008 | −0.1726 | −0.4738 | −0.6239 | −1.5405 |
| 6 | −3.3870 | −0.3527 | 1.0930 | 0.5952 | −1.4915 |
| 7 | 0.0000 | 0.0002 | 0.0001 | 0.0003 | −0.0000 |
| 8 | 2.3890 | 0.0555 | −0.3640 | −0.1868 | 1.1705 |
| 9 | −0.0000 | −0.1361 | −0.0023 | 1.1588 | 0.1557 |
| 10 | 1.7929 | 0.1569 | −0.5304 | −0.1730 | 0.4279 |
| Σ | 0.2293 | −0.0254 | −0.0217 | 0.1661 | 0.1592 |

| Embodiment 4 | | | | | |
|---|---|---|---|---|---|
| | Spherical Aberration | Astigmatism | Coma | Distortion | Petzval Sum |
| 1 | 1.1122 | 0.0314 | 0.1870 | 0.1274 | 0.7267 |
| 2 | 0.1077 | 0.7650 | −0.2871 | −1.4588 | −0.2175 |
| 3 | −0.0256 | −0.0034 | −0.0094 | 0.3395 | 0.9321 |
| 4 | −0.4920 | −0.4284 | 0.4591 | 0.3847 | 0.0160 |
| 5 | −1.6166 | −0.1864 | −0.5489 | −0.5942 | −1.5635 |
| 6 | −3.4673 | −0.3428 | 1.0902 | 0.5863 | −1.5219 |
| 7 | 0.0632 | 0.0739 | 0.0684 | 0.0869 | 0.0064 |
| 8 | 2.5532 | 0.0690 | −0.4198 | −0.2100 | 1.2081 |
| 9 | −0.0005 | −0.1646 | 0.0093 | 1.0791 | 0.1035 |
| 10 | 2.0019 | 0.1580 | −0.5624 | −0.1752 | 0.4657 |
| Σ | 0.2364 | −0.0283 | −0.0136 | 0.1658 | 0.1557 |

| Embodiment 5 | | | | | |
|---|---|---|---|---|---|
| | Spherical Aberration | Astigmatism | Coma | Distortion | Petzval Sum |
| 1 | 0.7305 | 0.0475 | 0.1862 | 0.1731 | 0.6317 |
| 2 | 0.0708 | 0.6353 | −0.2121 | −1.3424 | −0.1870 |
| 3 | 0.0257 | 0.0034 | 0.0093 | 0.3329 | 0.9151 |
| 4 | −0.3258 | −0.2946 | 0.3098 | 0.2700 | 0.0106 |
| 5 | −1.0559 | −0.1755 | −0.4304 | −0.6613 | −1.4468 |
| 6 | −3.0291 | −0.3579 | 1.0412 | 0.5995 | −1.3861 |
| 7 | 0.0141 | 0.0695 | 0.0314 | 0.1330 | −0.0095 |

-continued

Embodiment 5

|  | Spherical Aberration | Astigmatism | Coma | Distortion | Petzval Sum |
|---|---|---|---|---|---|
| 8 | 2.0126 | 0.0764 | −0.3920 | −0.2264 | 1.0861 |
| 9 | −0.0007 | −0.1858 | 0.0115 | 1.0653 | 0.1201 |
| 10 | 1.7860 | 0.1539 | −0.5243 | −0.1702 | 0.4257 |
| Σ | 0.2283 | −0.0279 | 0.0305 | 0.1735 | 0.1599 |

As explained in detail in the above and illustrated by embodiments, the Gauss type lens system according to the present invention has the aperture ratio of 1.8, field angle of 46° or more and back focal length of 0.72 f or more and, moreover, has favourably corrected aberrations in spite of the fact that the price of lens system is made low by using high refractive-index high-dispersion glass materials for many of lenses.

We claim:

1. A Gauss type lens system comprising a first, second, third and fourth lens components, said first lens component being a positive meniscus lens, said second lens component being a cemented doublet consisting of a positive lens and negative lens, said third lens component being a cemented doublet consisting of a negative lens and positive lens, said fourth lens component being a biconvex lens, said Gauss type lens system satisfying the following conditions:

(1) $(\nu_1+\nu_5+\nu_6)/3 < 39$, $\nu_3$, $\nu_4 < 30$
(2) $1.7 < n_1$, $n_5$, $n_6$
(3) $0.07 < n_3 - n_2 < 0.21$
(4) $0.13\,f < d_3+d_4 < 0.17\,f$
(5) $0.9 < f_1/f_6 < 1.3$
(6) $0.58\,f < r_1 < 0.72\,f$ wherein reference symbols $\nu_1$, $\nu_3$, $\nu_4$, $\nu_5$ and $\nu_6$ respectively represent Abbe's numbers of the first lens component, lens on the image side in the second lens component, respective lenses constituting the third lens component, and fourth lens component, reference symbols $n_1$, $n_2$, $n_3$, $n_5$ and $n_6$ respectively represent refractive indices of the first lens component, respective lenses constituting the second lens component, lens on the image side in the third lens component, and fourth lens component, reference symbols $d_3$ and $d_4$ respectively represent thicknesses of respective lenses constituting the second lens component, reference symbol $r_1$ represents the radius of curvature of the lens surface on the object side of the first lens component, reference symbols $f_1$ and $f_6$ respectively represent focal lengths of the first and fourth lens components and reference symbol f represents the focal length of the lens system as a whole.

2. A Gauss type lens system according to claim 1 further satisfying the following condition:

(7) $0.12\,f < d_6+d_7 < 0.16\,f$ wherein reference symbols $d_6$ and $d_7$ respectively represent thicknesses of respective lenses constituting the third lens component.

3. A Gauss type lens system according to claim 1, in which said Gauss type lens system has the following numerical data:

Embodiment 1

| | f = 100 | F/1.8 | |
|---|---|---|---|
| $r_1 = 64.093$ | | | |
| | $d_1 = 8.687$ | $n_1 = 1.80518$ | $\nu_1 = 25.4$ |
| $r_2 = 236.829$ | | | |
| | $d_2 = 0.309$ | | |
| $r_3 = 41.108$ | | | |
| | $d_3 = 12.336$ | $n_2 = 1.58913$ | $\nu_2 = 61.1$ |
| $r_4 = 814.577$ | | | |
| | $d_4 = 2.510$ | $n_3 = 1.78472$ | $\nu_3 = 25.7$ |
| $r_5 = 29.030$ | | | |
| | $d_5 = 25.097$ | | |
| $r_6 = -29.731$ | | | |
| | $d_6 = 2.510$ | $n_4 = 1.76182$ | $\nu_4 = 26.6$ |
| $r_7 = 944.518$ | | | |
| | $d_7 = 11.100$ | $n_5 = 1.834$ | $\nu_5 = 37.2$ |
| $r_8 = -39.351$ | | | |
| | $d_8 = 0.290$ | | |
| $r_9 = 467.767$ | | | |
| | $d_9 = 6.178$ | $n_6 = 1.834$ | $\nu_6 = 37.2$ |
| $r_{10} = -99.895$ | | | |
| Σd = 69.016 | | | |
| $f_1 = 106.742$ | $f_6 = 99.191$ | $f_1/f_6 = 1.076$ | |
| $f_B = 72.877$ | | | | wherein reference symbols $r_1$ through $r_{10}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the lens system as a whole, reference symbol $f_1$ represents the focal length of the first lens component, reference symbol $f_6$ represents the focal length of the fourth lens component, and reference symbol $f_B$ represents the back focal length.

4. A Gauss type lens system according to claim 1, in which said Gauss type lens system has the following numerical data:

Embodiment 2

| | f = 100 | F/1.8 | |
|---|---|---|---|
| $r_1 = 65.388$ | | | |
| | $d_1 = 8.687$ | $n_1 = 1.78472$ | $\nu_1 = 25.7$ |
| $r_2 = 252.404$ | | | |
| | $d_2 = 0.290$ | | |
| $r_3 = 41.374$ | | | |
| | $d_3 = 12.722$ | $n_2 = 1.60311$ | $\nu_2 = 60.7$ |
| $r_4 = 673.682$ | | | |
| | $d_4 = 2.510$ | $n_3 = 1.78472$ | $\nu_3 = 25.7$ |
| $r_5 = 28.932$ | | | |
| | $d_5 = 25.097$ | | |
| $r_6 = -29.214$ | | | |
| | $d_6 = 3.185$ | $n_4 = 1.72825$ | $\nu_4 = 28.5$ |
| $r_7 = -942.808$ | | | |
| | $d_7 = 10.811$ | $n_5 = 1.80610$ | $\nu_5 = 41.0$ |
| $r_8 = -39.208$ | | | |
| | $d_8 = 0.290$ | | |
| $r_9 = 475.436$ | | | |
| | $d_9 = 6.236$ | $n_6 = 1.80610$ | $\nu_6 = 41.0$ |
| $r_{10} = -93.919$ | | | |
| Σd = 69.827 | | | |
| $f_1 = 110.210$ | $f_6 = 97.769$ | $f_1/f_6 = 1.127$ | |
| $f_B = 73.063$ | | | | wherein reference symbols $r_1$ through $r_{10}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the lens system as a whole, reference symbol $f_1$ represents the focal length of the first lens component, reference symbol $f_6$ represents the focal length of the fourth lens component, and reference symbol $f_B$ represents the back focal length.

5. A Gauss type lens system according to claim 1, in which said Gauss type lens system has the following numerical data:

| Embodiment 3 | | | |
|---|---|---|---|
| | $f = 100$ | $F/1.8$ | |
| $r_1 = 64.790$ | | | |
| | $d_1 = 7.452$ | $n_1 = 1.76182$ | $\nu_1 = 26.6$ |
| $r_2 = 200.599$ | | | |
| | $d_2 = 0.425$ | | |
| $r_3 = 41.990$ | | | |
| | $d_3 = 12.336$ | $n_2 = 1.697$ | $\nu_2 = 48.5$ |
| $r_4 = 398.114$ | | | |
| | $d_4 = 2.896$ | $n_3 = 1.78472$ | $\nu_3 = 25.7$ |
| $r_5 = 28.541$ | | | |
| | $d_5 = 25.444$ | | |
| $r_6 = -28.991$ | | | |
| | $d_6 = 2.896$ | $n_4 = 1.76182$ | $\nu_4 = 26.6$ |
| $r_7 = -386.093$ | | | |
| | $d_7 = 11.023$ | $n_5 = 1.762$ | $\nu_5 = 40.2$ |
| $r_8 = -36.948$ | | | |
| | $d_8 = 0.193$ | | |
| $r_9 = 286.357$ | | | |
| | $d_9 = 6.042$ | $n_6 = 1.8044$ | $\nu_6 = 39.6$ |
| $r_{10} = -104.178$ | | | |
| | $\Sigma d = 68.707$ | | |
| | $f_1 = 122.708$ | $f_6 = 95.622$ | $f_1/f_6 = 1.283$ |
| | $f_B = 72.293$ | | | wherein reference symbols $r_1$ through $r_{10}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the lens system as a whole, reference symbol $f_1$ represents the focal length of the first lens component, reference symbol $f_6$ represents the focal length of the fourth lens component, and reference symbol $f_B$ represents the back focal length.

6. A Gauss type lens system according to claim 1, in which said Gauss type lens system has the following numerical data:

| Embodiment 4 | | | |
|---|---|---|---|
| | $f = 100$ | $F/1.8$ | |
| $r_1 = 60.506$ | | | |
| | $d_1 = 8.303$ | $n_1 = 1.78472$ | $\nu_1 = 25.7$ |
| $r_2 = 202.144$ | | | |
| | $d_2 = 0.290$ | | |
| $r_3 = 39.774$ | | | |
| | $d_3 = 11.790$ | $n_2 = 1.58913$ | $\nu_2 = 61.1$ |
| $r_4 = 384.449$ | | | |
| | $d_4 = 2.539$ | $n_3 = 1.76182$ | $\nu_3 = 26.6$ |
| $r_5 = 27.657$ | | | |
| | $d_5 = 25.181$ | | |
| $r_6 = -28.413$ | | | |
| | $d_6 = 2.504$ | $n_4 = 1.76182$ | $\nu_4 = 26.6$ |
| $r_7 = 206.272$ | | | |

-continued

| Embodiment 4 | | | |
|---|---|---|---|
| | $d_7 = 10.417$ | $n_5 = 1.804$ | $\nu_5 = 49.6$ |
| $r_8 = -36.892$ | | | |
| | $d_8 = 0.290$ | | |
| $r_9 = 430.966$ | | | |
| | $d_9 = 5.986$ | $n_6 = 1.80518$ | $\nu_6 = 25.4$ |
| $r_{10} = -95.779$ | | | |
| | $\Sigma d = 67.300$ | | |
| | $f_1 = 107.278$ | $f_6 = 97.820$ | $f_1/f_6 = 1.097$ |
| | $f_B = 73.063$ | | | wherein reference symbols $r_1$ through $r_{10}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the lens system as a whole, reference symbol $f_1$ represents the focal length of the first lens component, reference symbol $f_6$ represents the focal length of the fourth lens component, and reference symbol $f_B$ represents the back focal length.

7. A Gauss type lens system according to claim 1, in which said Gauss type lens system has the following numerical data:

| Embodiment 5 | | | |
|---|---|---|---|
| | $f = 100$ | $F/1.8$ | |
| $r_1 = 69.607$ | | | |
| | $d_1 = 7.436$ | $n_1 = 1.78472$ | $\nu_1 = 25.7$ |
| $r_2 = 235.144$ | | | |
| | $d_2 = 0.424$ | | |
| $r_3 = 43.088$ | | | |
| | $d_3 = 12.714$ | $n_2 = 1.65100$ | $\nu_2 = 56.2$ |
| $r_4 = 426.190$ | | | |
| | $d_4 = 3.275$ | $n_3 = 1.78472$ | $\nu_3 = 25.7$ |
| $r_5 = 30.390$ | | | |
| | $d_5 = 25.390$ | | |
| $r_6 = -30.236$ | | | |
| | $d_6 = 3.468$ | $n_4 = 1.72151$ | $\nu_4 = 29.2$ |
| $r_7 = -315.462$ | | | |
| | $d_7 = 11.558$ | $n_5 = 1.81554$ | $\nu_5 = 44.5$ |
| $r_8 = -41.358$ | | | |
| | $d_8 = 0.193$ | | |
| $r_9 = 373.982$ | | | |
| | $d_9 = 6.030$ | $n_6 = 1.81554$ | $\nu_6 = 44.5$ |
| $r_{10} = -105.510$ | | | |
| | $\Sigma d = 70.488$ | | |
| | $f_1 = 123.561$ | $f_6 = 101.479$ | $f_1/f_6 = 1.218$ |
| | $f_B = 72.454$ | | | wherein reference symbols $r_1$ through $r_{10}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the lens system as a whole, reference symbol $f_1$ represents the focal length of the first lens component, reference symbol $f_6$ represents the focal length of the fourth lens component, and reference symbol $f_B$ represents the back focal length.

* * * * *